(12) United States Patent
Brockhaus et al.

(10) Patent No.: US 10,867,014 B2
(45) Date of Patent: Dec. 15, 2020

(54) DEVICE AND METHOD FOR ADAPTING THE USE OF AN APPARATUS

(71) Applicant: Siemens Aktiengesellschaft, Munich (DE)

(72) Inventors: Hendrik Brockhaus, Unterbiberg (DE); Jens-Uwe Bußer, Neubiberg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 15/572,570

(22) PCT Filed: May 9, 2016

(86) PCT No.: PCT/EP2016/060340
§ 371 (c)(1),
(2) Date: Nov. 8, 2017

(87) PCT Pub. No.: WO2016/188730
PCT Pub. Date: Dec. 1, 2016

(65) Prior Publication Data
US 2018/0137259 A1 May 17, 2018

(30) Foreign Application Priority Data

May 27, 2015 (DE) .......................... 10 2015 209 714

(51) Int. Cl.
*G06F 21/10* (2013.01)
*G06F 21/12* (2013.01)
(Continued)

(52) U.S. Cl.
CPC ............ *G06F 21/105* (2013.01); *G06F 21/12* (2013.01); *G06F 21/44* (2013.01); *H04L 9/321* (2013.01);
(Continued)

(58) Field of Classification Search
CPC ........ G06F 21/105; G06F 21/12; G06F 21/44; G06F 21/606; G06F 21/10; G06F 21/84;
(Continued)

(56) References Cited

U.S. PATENT DOCUMENTS 6,202,092 B1 * 3/2001 Takimoto ................ G06F 21/84
358/1.13
6,557,105 B1 * 4/2003 Tardo ..................... G06F 21/105
713/170
(Continued)

FOREIGN PATENT DOCUMENTS

| CN | 101916415 A | 12/2010 |
| CN | 102184362 A | 9/2011 |

(Continued)

OTHER PUBLICATIONS

PCT International Search Report corresponding to PCT International Application No. PCT/EP2016/060340, dated Jul. 21, 2016.
(Continued)

*Primary Examiner* — Jeffrey C Pwu
*Assistant Examiner* — Ali H. Cheema
(74) *Attorney, Agent, or Firm* — Schmeiser, Olsen & Watts LLP

(57) ABSTRACT

A device for adapting the use of an apparatus is provided. The device has a processing unit for checking if a license for the apparatus exists and for producing a certificate request and a transmitting/receiving unit for transmitting the certificate request to a certification server and for receiving a certificate from the certification server in response to the certificate request. The processing unit is designed to check if information contained in the certificate match the license information and to adapt the use of the apparatus on the basis of the certificate. The invention further relates to a system having such a device and to a corresponding method for
(Continued)

Figure 1:
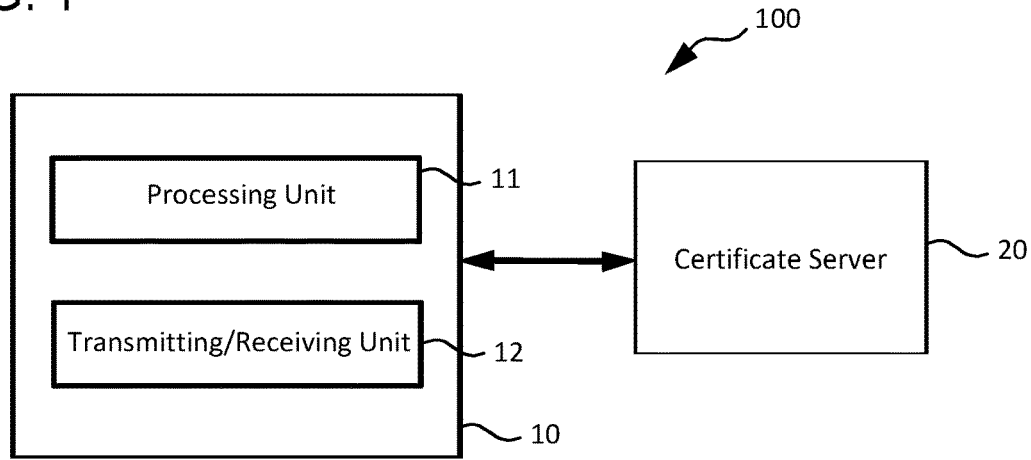

adapting the use of an apparatus. By the device, acceptance of a certificate by an apparatus can be restricted such that the newly obtained certificates can be subjected to certain conditions. The conditions can, for example, define the use of the apparatus.

16 Claims, 1 Drawing Sheet

(51) Int. Cl.
- *G06F 21/44* (2013.01)
- *H04L 9/32* (2006.01)
- *H04L 9/08* (2006.01)
- *H04L 29/06* (2006.01)
- *G06F 21/60* (2013.01)
- *G06F 21/84* (2013.01)

(52) U.S. Cl.
CPC ........ *H04L 9/3263* (2013.01); *H04L 63/0823* (2013.01); *G06F 21/10* (2013.01); *G06F 21/606* (2013.01); *G06F 21/608* (2013.01); *G06F 21/84* (2013.01); *H04L 9/0838* (2013.01); *H04L 63/08* (2013.01)

(58) Field of Classification Search
CPC ... G06F 21/608; H04L 9/321; H04L 63/0823; H04L 9/3263; H04L 9/32; H04L 9/0838; H04L 63/08; H04N 5/913; H04N 1/00344; H04W 4/025
USPC ............ 726/26, 27; 713/164, 156, 170, 175; 370/39, 329; 709/220; 380/256; 705/1.1, 51, 59; 358/1.13, 1.14
See application file for complete search history.

(56) References Cited

U.S. PATENT DOCUMENTS

| | | | | |
|---|---|---|---|---|
| 8,245,286 B2* | 8/2012 | Nasu | ............... | H04L 63/0823 713/156 |
| 2003/0156719 A1* | 8/2003 | Cronce | ............... | H02K 1/20 |
| 2003/0191936 A1* | 10/2003 | Kawatsura | .......... | H04L 63/0823 713/156 |
| 2004/0117784 A1* | 6/2004 | Endoh | ................ | G06F 21/10 717/169 |
| 2005/0210254 A1* | 9/2005 | Gabryjelski | .......... | G06F 21/105 713/175 |
| 2005/0223415 A1* | 10/2005 | Oho | ................ | G06F 21/606 726/27 |
| 2006/0026105 A1* | 2/2006 | Endoh | ................ | G06F 21/10 705/59 |
| 2006/0106721 A1* | 5/2006 | Hori | ................ | H04L 9/0838 705/51 |
| 2008/0027742 A1* | 1/2008 | Maeda | ................ | G06F 21/105 705/1.1 |
| 2009/0265545 A1* | 10/2009 | Satoh | ................ | H04L 9/3263 713/156 |
| 2010/0214589 A1* | 8/2010 | Fukano | ................ | G06F 21/608 358/1.14 |
| 2011/0162080 A1* | 6/2011 | Hayami | ................ | G06F 21/105 726/26 |
| 2013/0132530 A1* | 5/2013 | Asahara | ............ | H04N 1/00344 709/220 |
| 2014/0351585 A1* | 11/2014 | Hayashi | ................ | H04N 5/913 713/164 |
| 2015/0296484 A1* | 10/2015 | Ekberg | ................ | H04W 64/003 370/329 |

FOREIGN PATENT DOCUMENTS

| | | | |
|---|---|---|---|
| CN | 102497374 A | 6/2012 | |
| CN | 102622538 A | 8/2012 | |
| CN | 103971933 A | 8/2015 | |
| DE | 10147948 A1 | 4/2003 | |
| EP | 2012494 B1 | 8/2014 | |
| JP | 4270241 B2 * | 5/2009 | ........... G06F 21/608 |
| WO | WO 2014193274 A1 | 12/2014 | |

OTHER PUBLICATIONS

Non-English Chinese Office Action for Application No. 201680030644.2, dated Mar. 25, 2020.

* cited by examiner

DEVICE AND METHOD FOR ADAPTING THE USE OF AN APPARATUS

CROSS-REFERENCE TO RELATED APPLICATIONS

This application claims priority to PCT Application No. PCT/EP2016/060340, having a filing date of May 9, 2016, based off of German application No. DE 102015209714.5 having a filing date of May 27, 2015, the entire contents of both of which are hereby incorporated by reference.

FIELD OF TECHNOLOGY

The following relates to a device for adapting the use of an apparatus. Furthermore, embodiments of the present invention relate to a system with such a device as well as a method for adapting the use of an apparatus.

BACKGROUND

In various fields, it is common for products and apparatuses to use licenses in order to bind the use of software, for example, to certain apparatuses. This can be done through the use of device-specific parameters, such as MAC addresses, IP addresses, or ID components of the apparatus.

Another way is to use software licenses that require an online connection to a licensing server of the manufacturer or in the network of the user. This can be done only once during the installation, at every startup, or continuously during the use of the software. In addition, licenses are known, which may restrict the use of a software.

In some cases, however, it may be desirable to subsequently restrict, modify or expand the use of an apparatus. However, an adaptation of the use of an apparatus should frequently only be possible through authorized users.

Against this background, a task of embodiments of the present invention is to influence, in a simple way, the generation of certificates that are bound to a specific apparatus and that can determine their use.

SUMMARY

A device for adapting the use of an apparatus is suggested in accordance with this. The device has a processing unit to verify whether there is a license for the apparatus, and to generate a certificate request, and a transmitting/receiving unit to send the certificate request to a certification server and to receive a certificate from the certification server in response to the certificate request. Thereby, the processing unit is set up to check if information contained in the certificate corresponds to license information and to adapt the use of the apparatus based on the certificate.

The proposed device makes it possible to generate a certificate based on a license that is already available or have it issued by a certification server. Within the scope of a bootstrapping, due to the already existing license, the new certificate can be made dependent on an already existing license or a validity of the license.

Thereby, the device can be an apparatus or a part of an apparatus a license is assigned to. The apparatus can be a product that a license can be assigned to.

The certification server can be a server for the creation of the certificate, which is called a certificate authority. The certification server can also contain a registration authority to check the identity of the device or the apparatus, i.e. a registration authority, include or communicate with this. The certification server checks the received certificate request and creates a certificate based on the information contained therein. The information of the license can define, for example, the content of the certificate to be created.

The respective unit, for example a processing unit or a transmitting/receiving unit can be technically implemented on a hardware and/or a software level. In the case of technical implementation on a hardware level, the respective unit can be designed as a device or as part of a device, for example as a computer or as a microprocessor. For example, the processing unit may be a processor, and the transmitting/receiving unit may be a transmitter/receiver. In the case of technical implementation on a software level, the respective unit can be designed as a computer-program product (non-transitory computer readable storage medium having instructions, which when executed by a processor, perform actions), as a function, as a routine or as part of a program code or as an executable object.

The transmitting/receiving unit can furthermore have one or a plurality of antennas in order to communicate with the certification server. Alternatively, this communication can also occur via a cable.

The certificate may, for example, expand, change or limit the use of the apparatus. In this way, it can be achieved that a user can use the apparatus to an enhanced extent, such as the enhancement of certain implemented features and functions. Furthermore, it may be desired that the user cannot unlock certain features or functions of the apparatus, for example within the scope of a test use or time-limited use. Among other things, communication encryption cannot be switched on or encryption can only occur using a cryptographically weak key-code.

Such a function can also be used, for example, if the same apparatus should be used in different countries if these countries have different encryption requirements or do not allow some encryptions. Furthermore, for example, a theft protection can be achieved if certain use permissions are not made possible by the certificate.

In accordance with an embodiment, the processing unit is set up to check if the license is valid. This license check can be used so that the device or the processing unit of the device can only request a new certificate if a valid license for the apparatus is available.

In accordance with an embodiment, the certificate request contains license information.

Information from the license can be added to the certificate request. This license information can define the apparatus or the characteristics of the apparatus.

In accordance with another embodiment, the processing unit is set up to select predefined information from the license information and add it to the certificate request.

Thereby, the processing unit may add mandatory data fields from the license to the certificate request. These mandatory data fields and predefined information can set, for example, which content the new certificate may have. Content can be understood in this context, for example, as the scope of functions of the apparatus to be activated. Furthermore, the predefined information can specify an identity of the apparatus.

In accordance with another embodiment, the processing unit is set up to check if the certification server, from which the certificate was generated, corresponds to the license information.

In this way, the processing unit can ensure that the received certificate was generated by a trusted certification server. Within the license, it can be specified which certification server is allowed to issue certificates and this information can be used during the verification.

In accordance with another embodiment, the processing unit is set up to output an error message if the information contained within the certificate and/or the certification server does not coincide with the license information.

If the processing unit determines that there is no valid license for the apparatus, or determines that the certification server, from which the certificate was received, or the information contained in the certificate does not coincide with the information in the license, the result of the verification is negative. In this case, the processing unit can cancel the generation process and provision of the certificate and issue an error message.

Alternatively, the processing unit can also send a signal to other units of the device or the apparatus, which only allows these to continue to function, for example transitionally, in a restricted state. Activation of this restricted state can lifted, for example, after a new communication with the certification server and the receipt of a valid certificate have taken place.

In accordance with another embodiment, the license has a signature, an identity of the apparatus and/or other data.

A license can be, for example, a digital document signed by the apparatus's manufacturer or by a body authorized by the manufacturer. This digital document or file can contain unique names for the licensed apparatus or the device. These unique names can be, for example, manufacturer and type names or the serial number of the apparatus or the device.

Furthermore, the license can have data, such as certificates, fingerprints of certificates of the admissible certification servers or the contents of fields that must be mandatorily contained or must not be contained in the certificate request or in the created certificate. For example, such contents may include names of the possibly permitted issuing certification servers, a customer name, the service area or target country, permitted or activated functions of the apparatus, access rights or the use of certain security functions, such as the type of encryption (e.g. encryption with strong cryptography, or only authentication and no encryption, or the use of weak cryptographic algorithms and key-codes for an exportable variant.)

In accordance with another embodiment, the license is a key-code certificate and/or an authorization certificate.

A key-code certificate is understood as a certificate that represents a key-code, for example, for communicating with other apparatuses or servers. The key-code certificate binds a public key-code to the identity of the apparatus. An authorization certificate in this context is understood as a certificate that binds the characteristics (attributes) of the apparatus to a certain identity or to other certificates. Thereby, an authorization certificate can, for example, define what functions of the apparatus can be used.

In accordance with another embodiment, the license has information on a plurality of apparatuses.

In accordance with this embodiment, the license can contain the identity of a plurality of apparatuses. Therefore, the same license can be used for many devices or apparatuses. This license must for example not be kept secret, but can be distributed via e-mail, CD, USB stick, download, etc.

In accordance with another embodiment, the device has a near field communication element that contains the license.

A near field communication element is understood as a Near Field Communication (NFC) device. For example, the license can be applied as an NFC element onto the packaging after the apparatus or the device has been packaged. Alternatively, the license can also be arranged directly on the apparatus or the device as an NFC element. In this way, the manufacturing and the packaging of the apparatus with the device can take place independently of the content of the license and the device or the apparatus can be stored since the license only has to be available at the time of generation or provision of the certificate and therefore can be assigned to the device or applied to it at a later time.

In accordance with another aspect, a system comprising a certification server to create a certificate, and a device for adapting the use of an apparatus as described in the above is proposed. Thereby, the transmitting/receiving unit of the device is set up to send a certificate request to the certification server and receive a certificate from the certification server.

In accordance with an embodiment, the certification server is set up to verify information that is contained within the certificate request.

In accordance with this embodiment, additionally or as an alternative to checking the license in the device, a central license verification can also be carried out by the certification server or a registration authority that is combined with the certification server or communicates with this. This makes it possible to detect manipulation to the device or the apparatus since the license is verified by a central authority.

In accordance with another aspect, a method for adapting the use of an apparatus is proposed. The method comprises the following steps: verification of whether a license is available for the apparatus, the generation of a certificate request, the sending of the certificate request to a certification server, the reception of a certificate from the certification servicer in response to the certificate request, the verification of whether information contained within the certificate corresponds to the license information, and the adaption of the use of the apparatus based on the certificate.

The embodiments and features described for the proposed device apply to the proposed method accordingly.

A computer-program product is also proposed, which initiates the method described above to be carried out on a program-controlled device.

A computer-program product, such as a computer-program means for example, can be, for instance, provided or supplied as a storage medium, such as a memory card, a USB stick, a CD-ROM, a DVD or also in the form of a downloadable file from a server in a network. This can occur, for example, in a wireless communication network by transmitting a related file with the computer-program product or the computer-program means.

Other possible implementations of embodiments of the invention also include combinations of features or embodiments described in the aforementioned or in the following with reference to the exemplary embodiments, which have not been explicitly mentioned. Thereby, a person skilled in the art can also add individual aspects as improvements or additions to the respective base form of embodiments of the invention.

BRIEF DESCRIPTION

Figure 2:
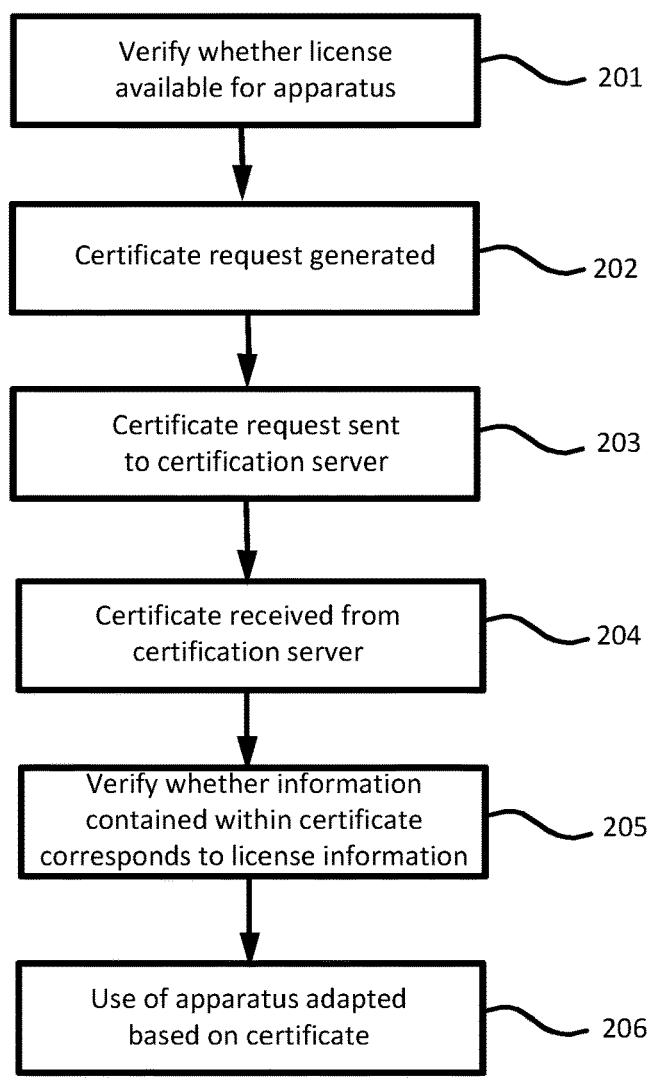

Some of the embodiments will be described in detail, with reference to the following figures, wherein like designations denote like members, wherein:

FIG. 1 shows a schematic block diagram of a system with a device for adapting the use of an apparatus; and FIG. 2 shows a schematic flow diagram of a method for adapting the use of an apparatus.

In the figures, elements that are identical or identical in function are provided with the same reference numbers provided that nothing else is indicated.

DETAILED DESCRIPTION

FIG. 1 shows a system 100 with a device 10 for adapting the use of an apparatus.

The device 10 has a processing unit 11 and a transmitting/receiving unit 12. The device 10 can communicate with a certification server 20 via the transmitting/receiving unit 12. The device 10 can be an apparatus or part of an apparatus (not shown).

For this purpose, the processing unit 11 initially verifies if a valid license is available for the apparatus. If this is the case, the processing unit 11 generates a certificate request, wherein the certificate request may contain license information. For example, the certificate request may contain mandatory information from the license.

The transmitting/receiving unit 12 then sends the certificate request to the certification server 20 and receives a certificate from this.

The processing unit 11 can now verify if information contained within the certificate corresponds to the license information, and the certificate can be provided for further use. For example, the certificate can be used to activate functions of the apparatus, meaning adapting the use of the apparatus.

FIG. 2 shows a method for adapting the use of an apparatus. The method comprises the steps 201 to 206.

In step 201, it is verified whether a license is available for the apparatus.

In step 202, a certificate request is generated, wherein the certificate request may contain license information.

In step 203, the certificate request is sent to a certification server 20.

In step 204, a certificate is received from the certification server 20 in response to the certification request.

In step 205, it is verified whether the information contained within the certificate corresponds to the license information.

In step 206, the use of the apparatus is then adapted based on the certificate.

Although the present invention has been described using exemplary embodiments, it can be modified in a multitude of ways.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A device for adapting the use of an apparatus, comprising:
a hardware processor, configured to verify whether there is a license for the apparatus, and to generate a certificate request; a transmitter including hardware, configured to send the certificate request to a certification server; and
a receiver including hardware configured to receive a certificate from the certification server in response to the certificate request,
wherein the hardware processor is configured to verify whether information contained within the certificate corresponds to license information of the license for the apparatus,
wherein the hardware processor is configured to adapt the use of the apparatus by using the certificate to activate a predetermined scope of functions of the apparatus set by the certificate such that use of the functions of the apparatus is at least one of restricted and expanded, and
wherein the certificate request contains predetermined information from the license for the apparatus, wherein the predetermined information defines the scope of functions on the apparatus that are activated by the certificate.

2. The device as claimed in claim 1, wherein the hardware processor is set up to check if the license is valid.

3. The device as claimed in claim 1, wherein the hardware processor is set up to select predefined information from the license information and add it to the certificate request.

4. The device as claimed in claim 1, wherein the hardware processor is set up to check if the certification server, from which the certificate was received, corresponds to the license information, wherein the license information comprises allowed certificate servers.

5. The device as claimed in claim 1, wherein the hardware processor is set up to output an error message if the information contained within the certificate and/or the certification server does not coincide with the license information.

6. The device as claimed in claim 1, wherein the license has at least one of a signature of the apparatus, and an identity of the apparatus.

7. The device as claimed in claim 1, wherein the license is at least one of a code-key certificate and an authorization certificate.

8. The device as claimed in claim 1, wherein the license has information on a plurality of apparatuses.

9. The device as claimed in claim 1, wherein the device has a near field communication element that contains the license.

10. The device as claimed in claim 1, wherein the predetermined scope of functions of the apparatus set by the certificate comprises required security functions to be used, wherein the required security functions include at least one of: type of encryption; authentication; and use of cryptographic algorithms.

11. The device as claimed in claim 1, wherein the hardware processor is configured to prevent the certificate request from being transmitted if the hardware processor determines that there is not a license for the apparatus.

12. The device as claimed in claim 1, wherein if the hardware processor determines that there is not a license for the apparatus, the hardware processor is configured to restrict the function of the apparatus such that only certain units of the apparatus are permitted to continue to function.

13. A system, comprising:
a certification server to create a certificate,
a device for adapting the use of an apparatus, comprising:
a hardware processor, configured to verify whether there is a license for the apparatus, and, if there is a license, to generate a certificate request;
a transmitter including hardware, configured to send the certificate request to the certification server; and
a receiver including hardware configured to receive a certificate from the certification server in response to the certificate request, wherein the hardware processor is configured to verify whether information contained within the certificate corresponds to license information of the license for the apparatus and wherein the hardware processor is configured to adapt the use of the apparatus by using the certificate to activate a predetermined scope of functions of the apparatus set by the certificate such that use of the functions of the apparatus is at least one of restricted and expanded, and wherein the certificate request contains predetermined information from the license for the apparatus, wherein the predetermined information defines the scope of functions on the apparatus that are activated by the certificate.

14. The system as claimed in claim 13, wherein the certification server is set up to verify information that is contained within the certificate request.

15. A method for adapting the use of an apparatus, comprising:

the verification of whether a license is available for the apparatus, the generation of a certificate request, the sending of the certificate request to a certification server, the reception of a certificate from the certification server in response to the certificate request, the verification of whether the information contained within the certificate corresponds to the license information of the license for the apparatus, and the adaptation of the use of the apparatus based on the certificate by activating a predetermined scope of functions of the apparatus set by the certificate, wherein the activating the predetermined scope of functions comprises at least one of restricting a use of the functions of the apparatus set by the certificate and expanding a use of the functions of the apparatus set by the certificate, wherein the certificate request contains predetermined information from the license for the apparatus, wherein the predetermined information defines the scope of functions on the apparatus that are activated by the certificate.

16. A computer-program product, comprising a computer readable hardware storage device having computer readable program code stored therein, said program code executable by a processor of a computer system to implement method to be carried out on a program-controlled device, the method comprising:

the verification of whether a license is available for the apparatus, the generation of a certificate request, the sending of the certificate request to a certification server, the reception of a certificate from the certification server in response to the certificate request, the verification of whether the information contained within the certificate corresponds to the license information of the license for the apparatus, and the adaptation of the use of the apparatus based on the certificate by activating a predetermined scope of functions of the apparatus set by the certificate, wherein the activating the predetermined scope of functions comprises at least one of restricting a use of the functions of the apparatus set by the certificate and expanding a use of the functions of the apparatus set by the certificate, wherein the certificate request contains predetermined information from the license for the apparatus, wherein the predetermined information defines the scope of functions on the apparatus that are activated by the certificate.

* * * * *